US012763241B2

(12) United States Patent
Winzer et al.

(10) Patent No.: US 12,763,241 B2
(45) Date of Patent: Oct. 13, 2026

(54) INDUCTIVE COUPLER WITH MAGNETIC MATERIAL

(71) Applicant: Infineon Technologies Austria AG, Villach (AT)

(72) Inventors: Annett Winzer, Dresden (DE); Michael Kirsch, Regensburg (DE); Lars Mueller-Meskamp, Dresden (DE)

(73) Assignee: Infineon Technologies Austria AG, Villach (AT)

(*) Notice: Subject to any disclaimer, the term of this patent is extended or adjusted under 35 U.S.C. 154(b) by 1151 days.

(21) Appl. No.: 17/844,524

(22) Filed: Jun. 20, 2022

(65) Prior Publication Data

US 2023/0411060 A1 Dec. 21, 2023

(51) Int. Cl.
*H01F 17/00* (2006.01)
*H01F 27/28* (2006.01)

(52) U.S. Cl.
CPC ..... *H01F 17/0013* (2013.01); *H01F 27/2804* (2013.01); *H01F 2027/2809* (2013.01)

(58) Field of Classification Search
CPC ......... H01F 27/2804; H01F 2027/2809; H01F 17/0006; H01F 17/0013; H01F 5/003; H01F 27/36; H01F 27/366; H01L 23/645; H01L 28/10; H01L 23/5227
USPC .................................. 336/200, 232; 257/531
See application file for complete search history.

(56) References Cited

U.S. PATENT DOCUMENTS

| | | | | |
|---|---|---|---|---|
| 5,420,558 A * | 5/1995 | Ito | H01F 17/0006 336/200 |
| 5,852,866 A * | 12/1998 | Kuettner | H01F 41/046 336/200 |
| 2002/0008605 A1* | 1/2002 | Gardner | H10D 1/20 336/200 |
| 2017/0278841 A1* | 9/2017 | Palumbo | H10D 1/692 |
| 2018/0097055 A1* | 4/2018 | Pizzi | H10D 1/20 |

FOREIGN PATENT DOCUMENTS

| | | | |
|---|---|---|---|
| CN | 106409480 A * | 2/2017 | H01F 41/041 |
| DE | 102008049756 A1 * | 5/2010 | H01F 19/00 |

OTHER PUBLICATIONS

Frank, Wolfgang, et al., "Coreless Transformer Provides Innovative Features", Bodo's Power Systems, Jan. 2007, 1-3.

* cited by examiner

*Primary Examiner* — Tszfung J Chan
(74) *Attorney, Agent, or Firm* — Murphy, Bilak & Homiller, PLLC

(57) ABSTRACT

A semiconductor die includes: a semiconductor substrate; a transmitter or receiver circuit in the semiconductor substrate; a multi-layer stack on the semiconductor substrate, the multi-layer stack including a plurality of metallization layers separated from one another by an interlayer dielectric; and a transformer in the multi-layer stack and electrically coupled to the transmitter or receiver circuit. The transformer includes a first winding formed in a first metallization layer of the plurality of metallization layers and a second winding formed in a second metallization layer of the plurality of metallization layers. The first winding and the second winding are inductively coupled to one another. A magnetic material in the multi-layer stack is adjacent to at least part of the transformer.

22 Claims, 9 Drawing Sheets

INDUCTIVE COUPLER WITH MAGNETIC MATERIAL

BACKGROUND

Inductive data couplers, which are formed from coils or inductors, are used for signal or energy transmission between galvanically isolated circuits. Ferromagnetic or ferrimagnetic cores typically placed in the center of the coils increase the magnetic field and the inductance of the inductors. For planar inductors, the coil center cannot be used for the core integration because the core center is used as a pad contact area. Furthermore, the planar primary coil and planar secondary coil are separated by an insulating material to avoid electrical breakdown.

Inductive data couplers integrated on semiconductor chips (dies) are affected by a limited maximum transmission energy due to the limited size of the coils. The signal or energy transmission of the inductive data coupler can be improved by using larger coils with a higher number of coil windings, which increases the inductor area and consequently the chip area, resulting in higher costs. Moreover, coreless inductors suffer from a low inductance and power dissipation due to magnetic losses due to magnetic stray fields. For inductive data couplers with planar inductors, the secondary side (output) relies on an additional power supply. This results in a high system complexity. For galvanic isolation between input and output of an inductive data coupler, the planar primary coil and planar secondary coil are separated by an insulating material. Different safety classes for single isolation devices refer to the robustness of the electrical insulation to overvoltage. However, any conducting material, such as a magnetic core, placed between the primary and secondary coils decreases the insulating capability of the data coupler.

Thus, there is a need for an improved inductive coupler design.

SUMMARY

According to an embodiment of a semiconductor die, the semiconductor die comprises: a semiconductor substrate; a transmitter or receiver circuit in the semiconductor substrate; a multi-layer stack on the semiconductor substrate, the multi-layer stack including a plurality of metallization layers separated from one another by an interlayer dielectric; a transformer in the multi-layer stack and electrically coupled to the transmitter or receiver circuit, the transformer including a first winding formed in a first metallization layer of the plurality of metallization layers and a second winding formed in a second metallization layer of the plurality of metallization layers, the first winding and the second winding being inductively coupled to one another; and a magnetic material in the multi-layer stack and adjacent to at least part of the transformer.

According to an embodiment of an electronic system, the electronic system comprises: an inductive power coupler formed in a multi-layer stack of a semiconductor die and configured to transfer power from a power transmitter to a power receiver over a galvanic isolation barrier, wherein the inductive power coupler includes a transformer that comprises: a first winding electrically coupled to the power transmitter and formed in a first metallization layer of the multi-layer stack; and a second winding electrically coupled to the power receiver and formed in a second metallization layer of the multi-layer stack, wherein the first winding and the second winding are inductively coupled to one another, wherein a magnetic material in the multi-layer stack is adjacent to at least part of the transformer.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide an improved inductive coupler design that includes a magnetic material for increasing the magnetic field generated by the inductive coupler and confining the magnetic field to the coils or inductors of the inductive coupler, resulting in an increased inductance and increased energy efficiency. In the case of a coreless transformer, the size of the inductive coupler can be decreased without comprising the insulating function of the transformer. The magnetic material, which acts as a magnetic core, may partly or completely surround the primary and secondary coils/inductors of the inductive coupler. The magnetic material may act as an electrical guard ring with a ground contact and as ferromagnetic or ferrimagnetic ring to increase the inductance and thereby the energy efficiency of the inductive coupler. The magnetic material also may provide magnetic shielding for adjacent devices. The magnetic material enables an inductive power supply on the secondary side (output).

Described next with reference to the figures are embodiments of the inductive coupler and electronic systems that use the inductive coupler for signal or energy transmission.

Figure 1:
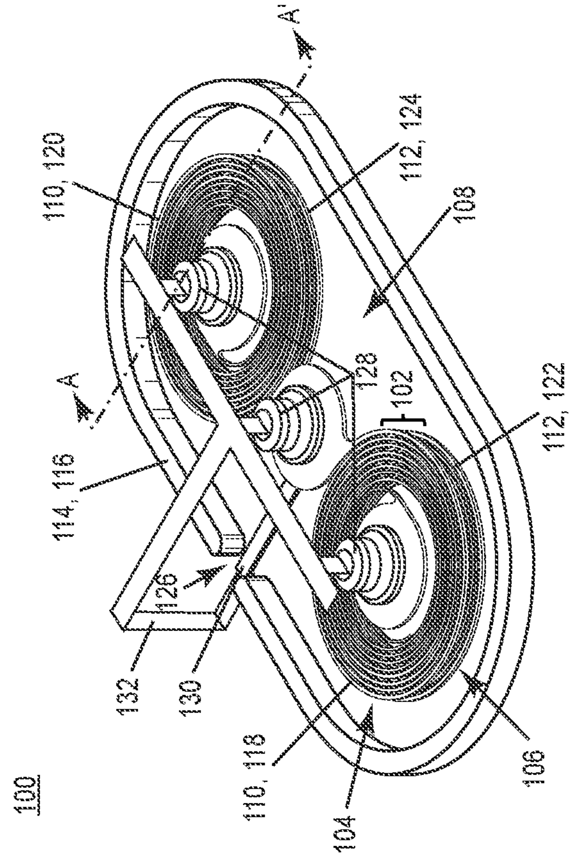
FIG. 1 illustrates a side perspective view of an inductive coupler designed for integration in a semiconductor die that includes a transmitter or receiver circuit.

FIG. 1 illustrates a side perspective view of an inductive coupler 100 designed for integration in a semiconductor die that includes a transmitter or receiver circuit. The semiconductor die is not shown in FIG. 1 to emphasize aspects of the inductive coupler 100. Subsequent figures show the inductive coupler 100 integrated in a semiconductor die and an electronic system that includes the inductive coupler 100.

The inductive coupler 100 includes a multi-layer stack 102 having two or more metallization layers 104, 106 separated from one another by an interlayer dielectric. The interlayer dielectric is not shown in FIG. 1 to provide an unobstructed view of the metallization layers 104, 106.

A transformer 108 formed in the multi-layer stack 102 is electrically coupled to the transmitter or receiver circuit included in the semiconductor die in which the inductive coupler 100 is integrated. The transformer 108 includes an upper winding 110 formed in an upper metallization layer 104 of the multi-layer stack 102 and a lower winding 112 formed in a lower metallization layer 106 of the multi-layer stack 102. The upper and lower transformer windings 110, 112 are inductively coupled but galvanically isolated from one another.

The multi-layer stack 102 of the inductive coupler 100 also includes a magnetic material 114 that is adjacent to at least part of the transformer 108. The magnetic material 114, usually a material with a high magnetic permeability, increases the magnetic field generated by the inductive coupler 100 and confines and guides the magnetic field to the transformer windings 110, 112, yielding increased inductance and energy efficiency. Different parts of the magnetic material 114 may be implemented by respective layers of the multi-layer stack 102.

The magnetic material 114 of the inductive coupler 100 is ferrimagnetic or ferromagnetic at room temperature, which allows for using the magnetic material 114 as a ground contact. In the case of being ferrimagnetic at room temperature, the magnetic material 114 may comprise Fe—O, Ni—Zn—Fe—O, Mn—Zn—Fe—O, Co—Fe—O, etc. In the case of being ferromagnetic at room temperature, the magnetic material 114 may comprise Fe, Ni—Fe, Ni—Cu—Fe, Ni—Mo—Fe, Co—Fe, Al—Ni—Co, etc. The ferromagnetic or ferrimagnetic material may be deposited by sputtering or an electrogalvanic process (pattern plating), for example. The magnetic material 114 is electrically insulated against the first and/or second transformer windings 110, 112. The magnetic material 114 may be a different material than the material forming at least one of the metallization layers 104, 106 of the multi-layer stack 102. For example, the magnetic material 114 may comprise Ni—Fe and the metallization layers 104, 106 may comprise aluminium or copper. Different portions of the magnetic material 114 may be either connected or insulated from one another, for example.

In FIG. 1, the magnetic material 114 of the inductive coupler 100 is part of a guard ring 116 that laterally surrounds at least part of the transformer 108. Also in FIG. 1, the transformer 108 has a dual-coil design in that the first transformer winding 110 includes a pair of first coils 118, 120 and the second transformer winding 112 includes a pair of second coils 122, 124. The magnetic material 114 of the guard ring 116 may laterally surround the pair of first coils 118, 120 and the pair of second coils 122, 124 with or without interruption. In the case of a dual-coil design, the guard ring 116 made from the magnetic material 114 may have a gap 126 aligned with the center of the transformer 108. In the case of a coreless transformer design having double-connected coils in the opposite direction, the magnetic fields of both coils 118, 120/122, 124 for each winding 110, 112 have opposite poles. Consequently, the magnetic field of a closed ring design is interfered with in the center between the pairs of coils 118, 120/122, 124. A gap 126 in the guard ring 116 made from the magnetic material 114 mitigates this effect.

The upper winding 110 of the transformer 108 may be energized at a plurality of primary ports 128. The lower winding 112 of the transformer 108 may be energized at a secondary port 130. A reference port 132 may be provided, e.g., for simulation, testing, etc.

Figure 2:
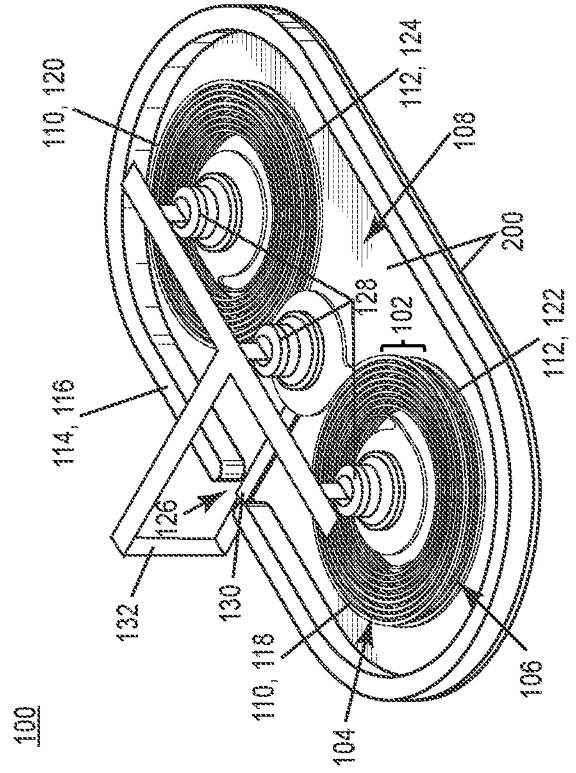
FIG. 2 illustrates a side perspective view of the inductive coupler, according to another embodiment.

FIG. 2 illustrates a side perspective view of the inductive coupler 100, according to another embodiment. The embodiment illustrated in FIG. 2 is similar to the embodiment illustrated in FIG. 1. In FIG. 2, the magnetic material 114 of the inductive coupler 100 overlaps the lower winding 112 of the transformer 108. For example, the magnetic material 114 may be part of a layer 200 of the multi-layer stack 102 disposed below the lower transformer winding 112. The lower magnetic layer 200 may partly or completely cover the backside of the lower transformer winding 112. Different portions of the lower magnetic layer 200 may be either connected or insulated from one another, for example.

Figure 3B:
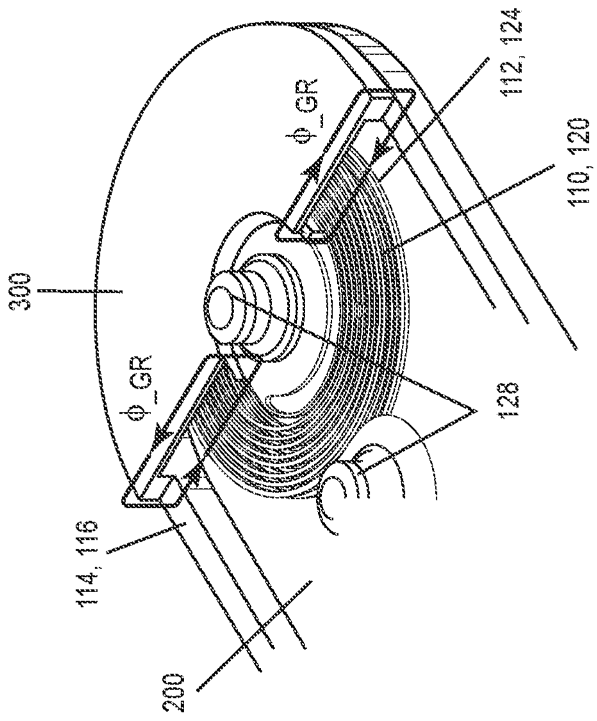
FIG. 3B shows the magnetic flux in the magnetic material of the inductive coupler, in the region of one half of the transformer part of the inductive coupler.
Figure 3A:
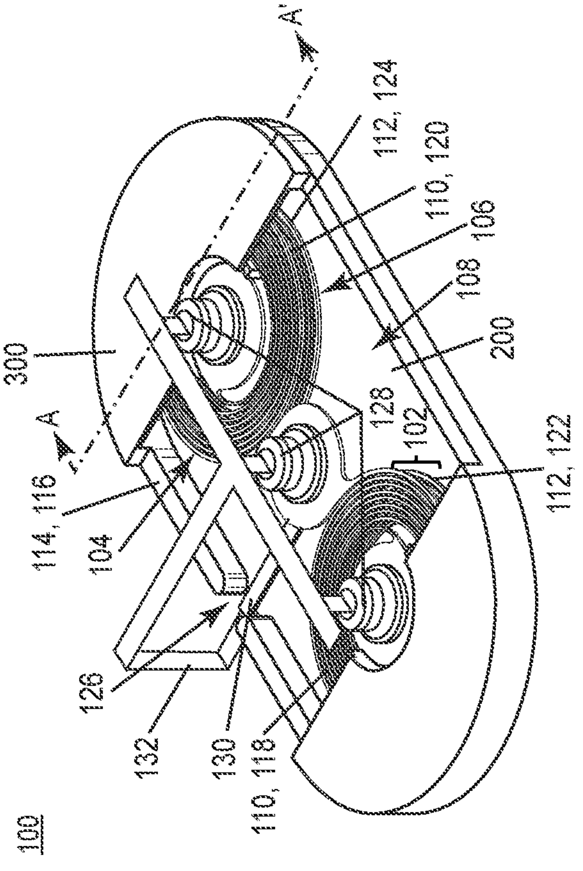
FIG. 3A illustrates a side perspective view of the inductive coupler, according to another embodiment.

FIG. 3A illustrates a side perspective view of the inductive coupler 100, according to another embodiment. FIG. 3B shows the magnetic flux $\phi_{\_GR}$ in the magnetic material 114 of the inductive coupler 100, in the region of the right half of the transformer 108.

The embodiment illustrated in FIGS. 3A and 3B is similar to the embodiment illustrated in FIG. 2. In FIGS. 3A and 3B, the magnetic material 114 of the inductive coupler 100 also overlaps the upper winding 110 of the transformer 108. For example, the magnetic material 114 may be part of a layer 300 of the multi-layer stack 102 disposed above the upper transformer winding 110. Different portions of the upper magnetic layer 300 may be either connected or insulated from one another, for example. In FIG. 3A, the upper magnetic layer 300 covers part but not all of the frontside of each coil 118, 120 of the upper transformer winding 110. In plan view, the magnetic material 114 of the inductive coupler 100 may overlap just the lower transformer winding 112, just the upper transformer winding 110, or both the lower transformer winding 112 and the upper transformer winding 110.

Figure 4:
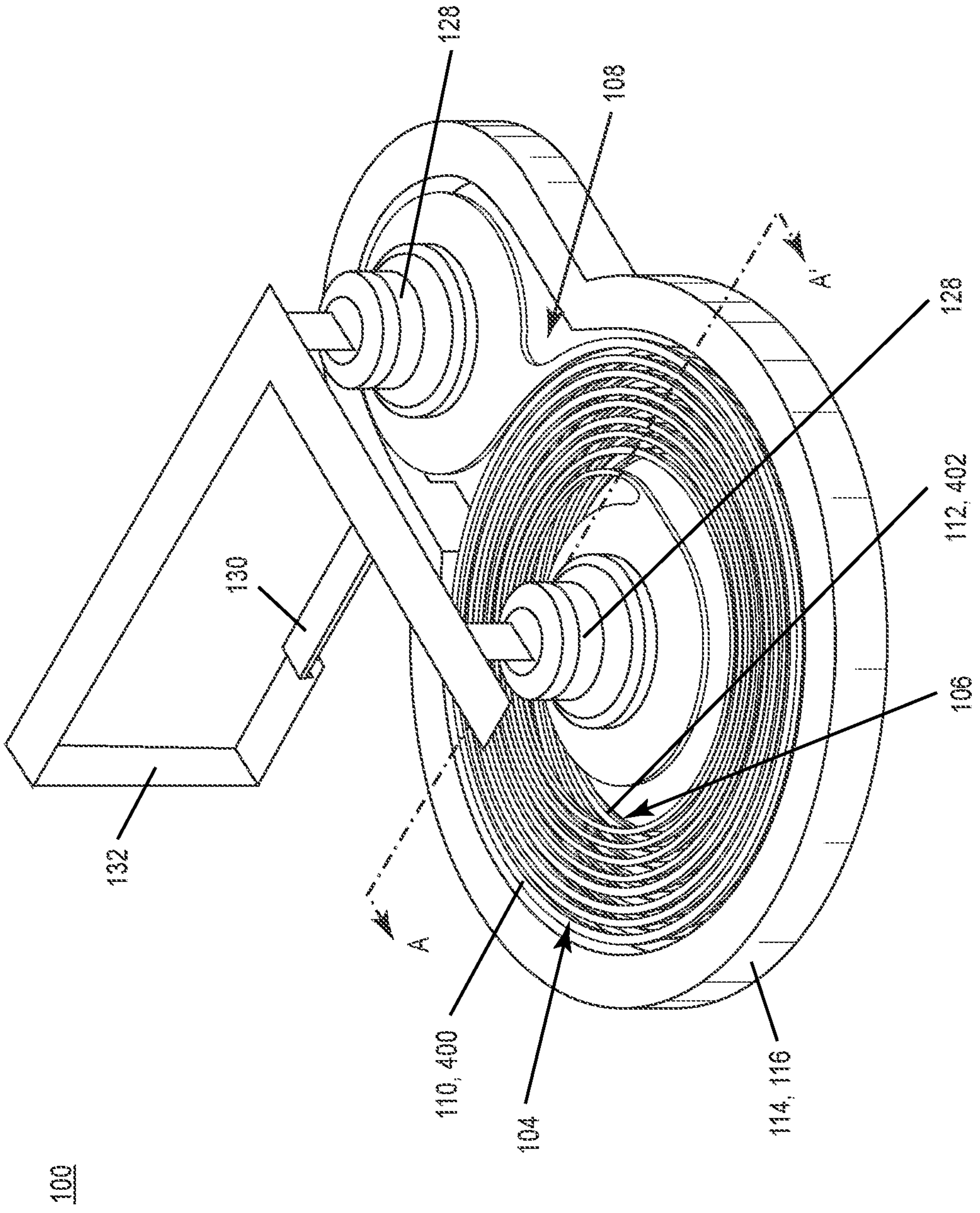
FIG. 4 illustrates a side perspective view of the inductive coupler, according to an embodiment.

FIG. 4 illustrates a side perspective view of the inductive coupler 100, according to another embodiment. In FIG. 4, the transformer 108 has a single-coil design in that the upper winding 110 of the transformer 108 has a single first coil 400 and the lower winding 112 of the transformer 108 also has a single second coil 402. The magnetic material 114 of the guard ring 116 may laterally surround the first single coil 400 of the first transformer winding 110 and the second single coil 402 of the second transformer winding 112 without interruption. That is, in the case of a single-coil design, the first single coil 400 of the first transformer winding 110 and the second single coil 402 of the second transformer winding 112 may be completely laterally closed around the respective coil 400, 402.

In plan view, the magnetic material 114 of the inductive coupler 100 also may overlap just the lower transformer winding 112, just the upper transformer winding 110, or both the lower transformer winding 112 and the upper transformer winding 110. Alternatively, the magnetic material 114 of the inductive coupler 100 may not overlap either the lower transformer winding 112 or the upper transformer winding 110 in plan view, e.g., as shown in FIG. 4.

Figure 5A:
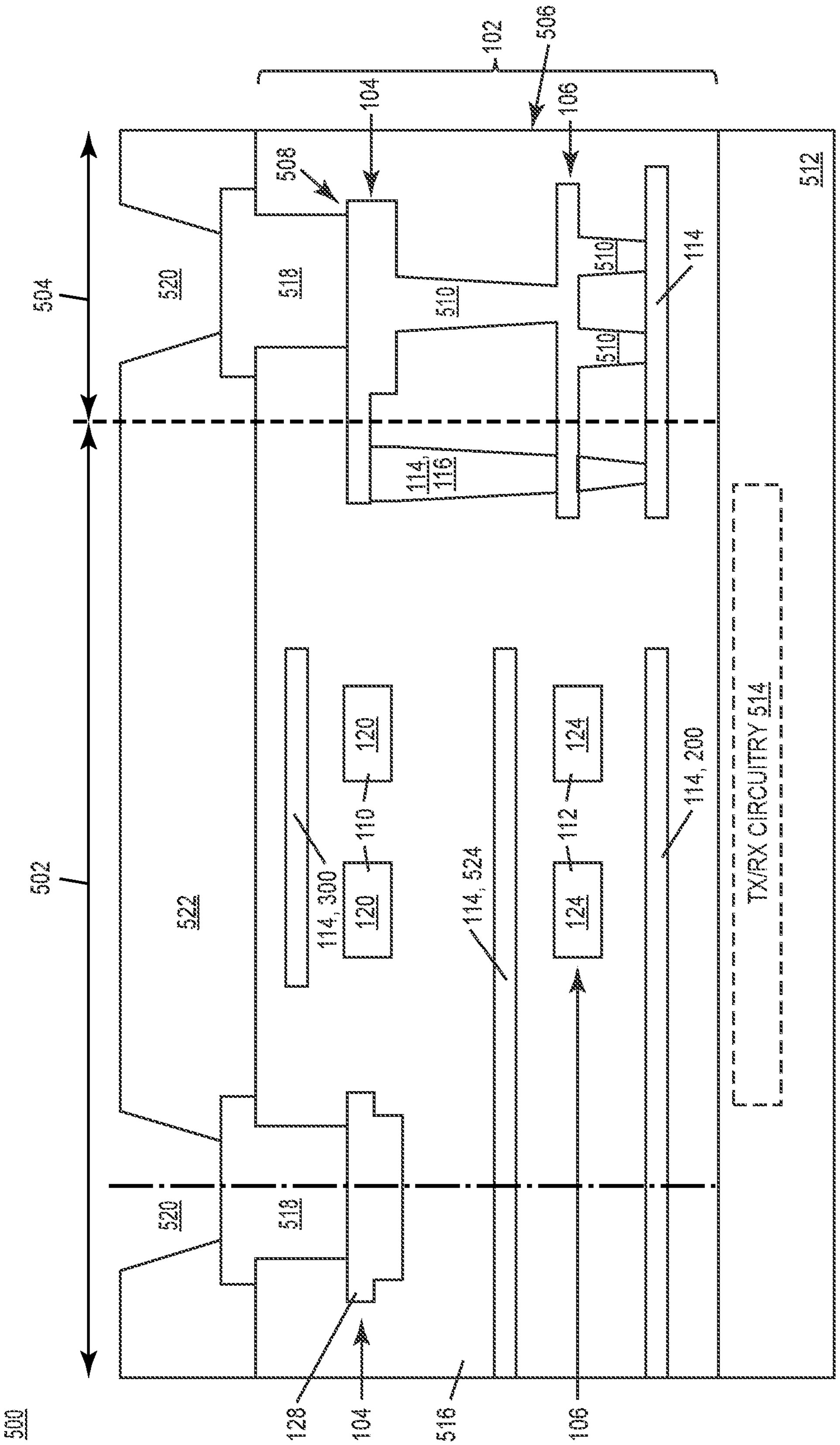
FIGS. 5A through 5C illustrate respective partial cross-sectional views of a semiconductor die that includes the inductive coupler, according to different embodiments.
Figure 5B:
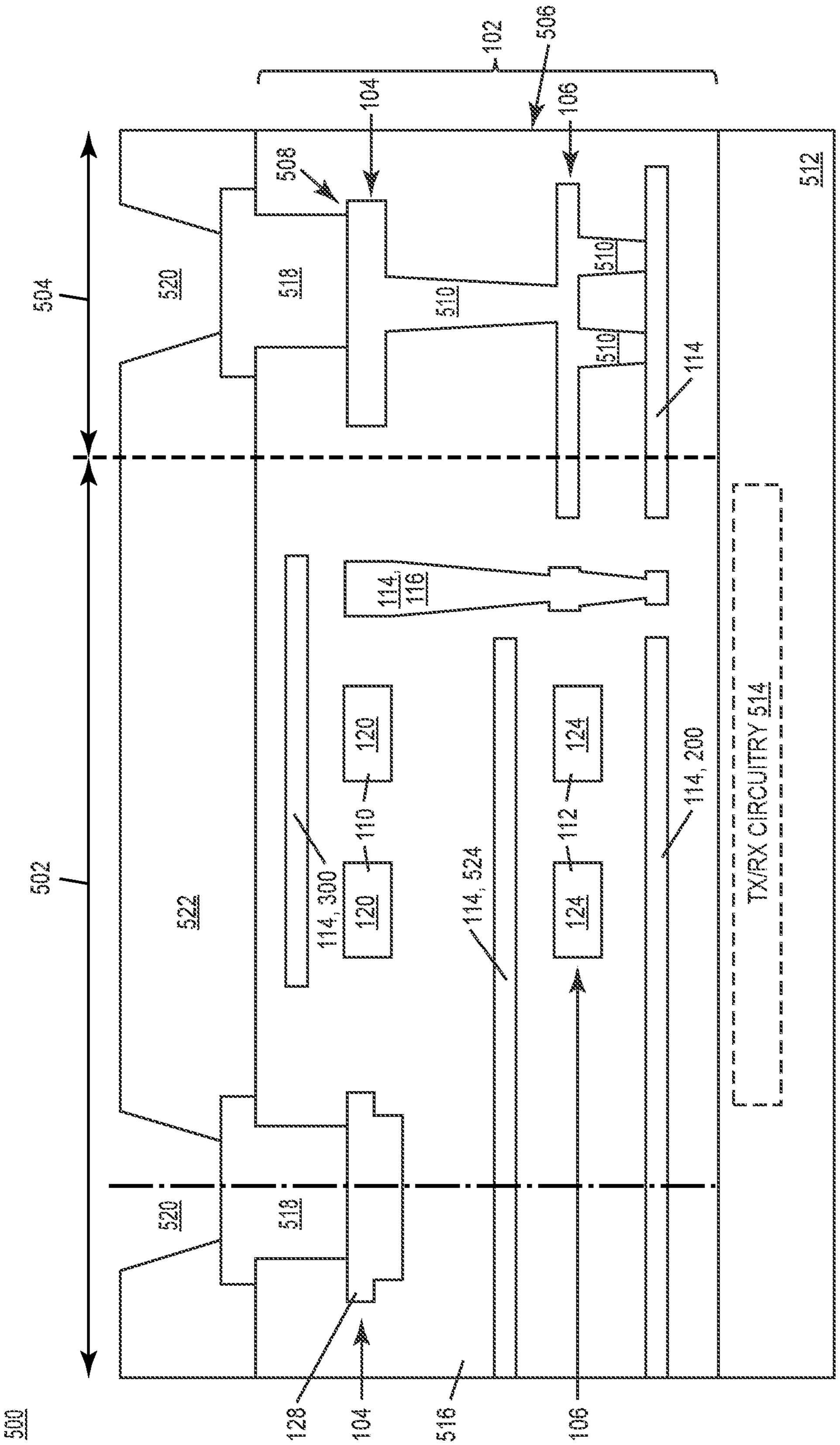
Figure 5C:
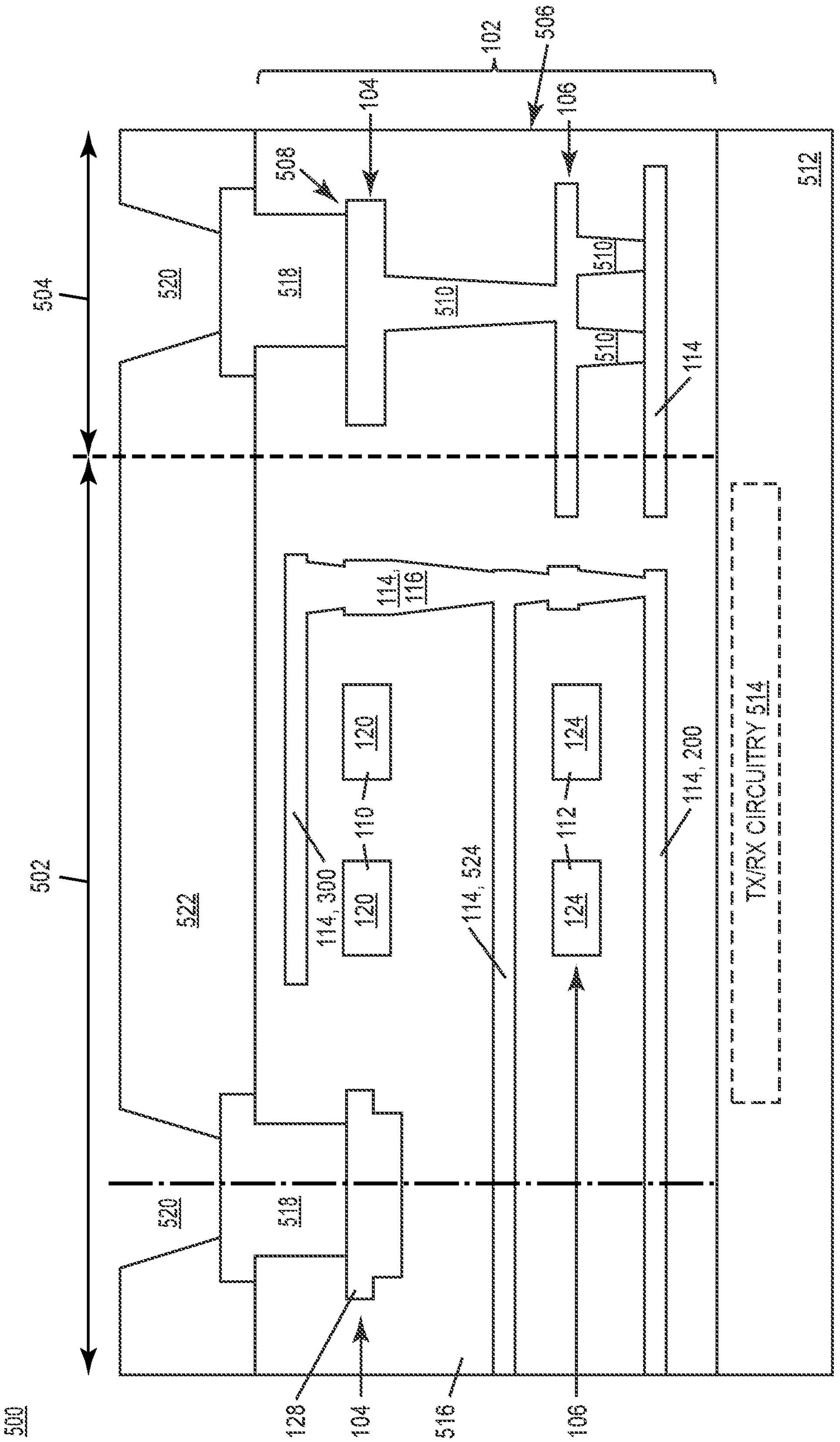

FIGS. 5A through 5C illustrate respective partial cross-sectional views of a semiconductor die 500 that includes the inductive coupler 100, according to different embodiments. The part of the semiconductor die 500 illustrated in FIGS. 5A through 5C includes an outer part 502 of the upper and lower coils 120, 124 of the upper and lower windings 110, 112 of the transformer 108, and a guard ring section 504 that separates the outer part 502 of the transformer 108 from the edge 506 of the die 500. The guard ring section 504 includes a guard ring 508 designed to isolate electrical disturbances and as a diffusion barrier for preventing contaminants such as water, ions, etc. from propagating inward from the edge 508 of the semiconductor die 500. The guard ring 508 may be formed from part of the metallization layers 104, 106 of the multi-layer stack 102 and metal vias 510 that extend between the metallization layers 104, 106. The outer part 502 of the transformer 108 shown in FIGS. 5A through 5C may correspond to the cross-section labeled A-A' in FIGS. 1, 2, 3A, and 4.

The semiconductor die 500 may include a power transmitter or a power receiver, for example. Accordingly, the inductive coupler 100 may be located on either the transmit or receive side of an electronic system, with galvanic isolation between the transmit and receive sides. The magnetic material 114 included in the inductive coupler 100 increases the inductance and thereby the energy efficiency of the inductive coupler 100. Accordingly, the inductive coupler 100 may be used to enable an inductive power supply on the secondary side (output) of the electronic system which allows for the omission of a conventional power supply on the secondary side.

FIG. 5A shows the semiconductor die 500 with a semiconductor substrate 512 and a power transmitter (TX) or receiver (RX) circuit 514 in the semiconductor substrate 512. The power TX/RX circuit 514 may include any standard circuitry used to wirelessly transmit and receive power over a galvanic isolation barrier. For wireless power transmission, the power TX/RX circuit 514 may include one or more power transistors electrically connected to the upper winding 110 of the transformer 108, a respective gate driver for driving each power transistor, a microcontroller for controlling each gate driver, a power supply for energizing the transformer winding 110 via the one or more power transistors, etc. For wireless power reception, the power TX/RX circuit 514 may include a synchronous bridge rectifier electrically connected to the lower winding 112 of the transformer 108, a gate driver for the synchronous bridge rectifier, a microcontroller for controlling the gate driver, etc. Power is wirelessly transmitted over the inductive coupler 100, which provides galvanic isolation between the transmit and receive sides.

The semiconductor substrate 512 of the die 500 that includes the inductive coupler 100 comprises one or more semiconductor materials that are used to form the power TX/RX circuit 514 and possibly other circuitry. For example, the semiconductor substrate 512 may comprise Si, silicon carbide (SiC), germanium (Ge), silicon germanium (SiGe), gallium nitride (GaN), gallium arsenide (GaAs), and the like. The semiconductor substrate 512 may be a bulk semiconductor material or may include one or more epitaxial layers grown on a bulk semiconductor material.

The multi-layer stack 102 of the inductive coupler 100 is formed on the semiconductor substrate 512. The multi-layer stack 102 includes two or more metallization layers 104, 106 separated from one another by an interlayer dielectric 516 such as SiOx, SiN, etc. Electrical contact to the transformer ports 128, 130 and to the guard ring 508 may be enabled by contact pads 518 that are exposed through openings 520 in a passivation 522 such as imide.

As previously described, the magnetic material 114 of the inductive coupler 100 may be ferrimagnetic or ferromagnetic at room temperature and is adjacent to at least part of the transformer 108. Also as previously described, the magnetic material 114 may include a guard ring 116 that laterally surroundings at least part of the transformer 108. The guard ring 116 formed by the magnetic material 114 may merge or connect to the guard ring 508, e.g., as shown in FIG. 5A. Separately or in combination, the magnetic material 114 of the inductive coupler 100 may include a lower magnetic layer 200 disposed below and overlapping the lower transformer winding 112 and/or an upper magnetic layer 300 disposed above and overlapping the upper transformer winding 110. Separately or in combination, the magnetic material 114 of the inductive coupler 100 may include an intermediary magnetic layer 524 interposed between the upper and lower transformer windings 110, 112. Ferromagnetic or ferrimagnetic material may be deposited by sputtering or electrogalvanic deposition (pattern plating), e.g., to form each part 116, 200, 300, 524 of the magnetic material 114.

In FIG. 5B, the guard ring part 116 of the magnetic material 114 of the inductive coupler 100 does not merge with or connect to the guard ring 508. Instead, the magnetic guard ring 116 is laterally spaced apart and disconnected from the guard ring 508 in FIG. 5B.

In FIG. 5C, the magnetic guard ring part 116 is laterally spaced apart and disconnected from the guard ring 508 as in FIG. 5B. Also, the guard ring part 116 of the magnetic material 114 merges with or connects to the lower, upper and intermediary magnetic layers 200, 300, 524 of the magnetic material 114 in FIG. 5C.

Figure 6E:
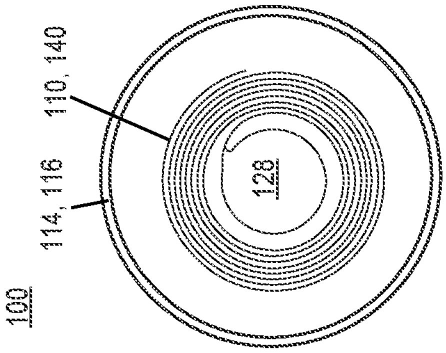
FIGS. 6A through 6E illustrate respective plan views of the inductive coupler, according to different embodiments.
Figure 6C:
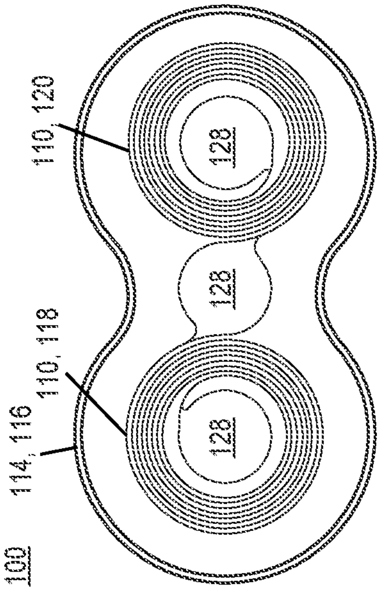
Figure 6D:
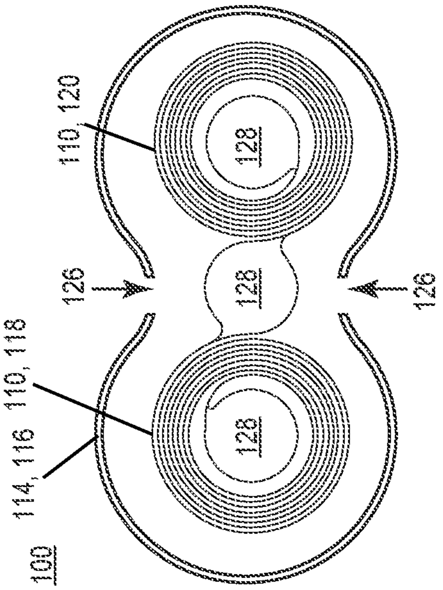
Figure 6A:
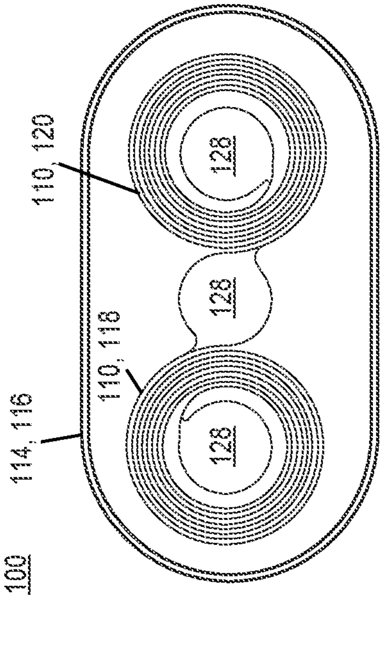
Figure 6B:
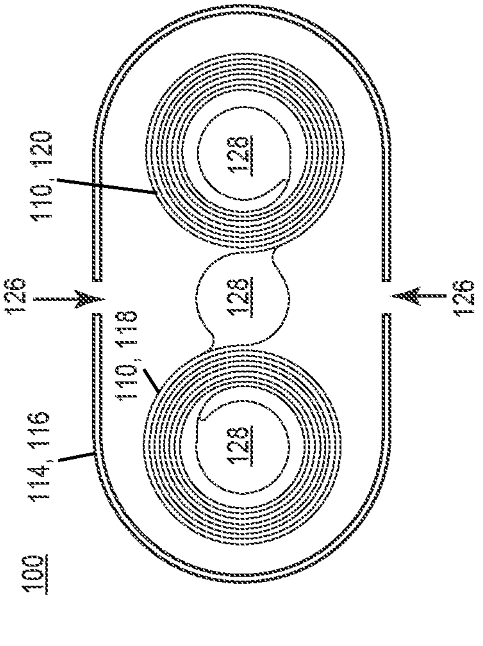

FIGS. 6A through 6D illustrate respective plan views of the inductive coupler 100, according to different embodiments. In FIG. 6A, the guard ring part 116 of the magnetic material 114 of the inductive coupler 100 laterally surrounds the entire transformer 108. In FIG. 6B, the magnetic guard ring 116 has a gap 126 that reduces interference with the magnetic field in the center of the transformer 108 between respective coil pairs 118, 120 for a dual-coil design. In FIG. 6C, the magnetic guard ring 116 follows the curvature of the transformer windings 110, 112. In FIG. 6D, the magnetic guard ring 116 follows the curvature of the transformer windings 110, 112 and has a gap 126 that reduces interference with the magnetic field in the center of the transformer 108 between respective coil pairs 118, 120 for a dual-coil design. FIG. 6E shows the guard ring part 116 of the magnetic material for a single-coil design, e.g., as illustrated in FIG. 4.

Figure 7:
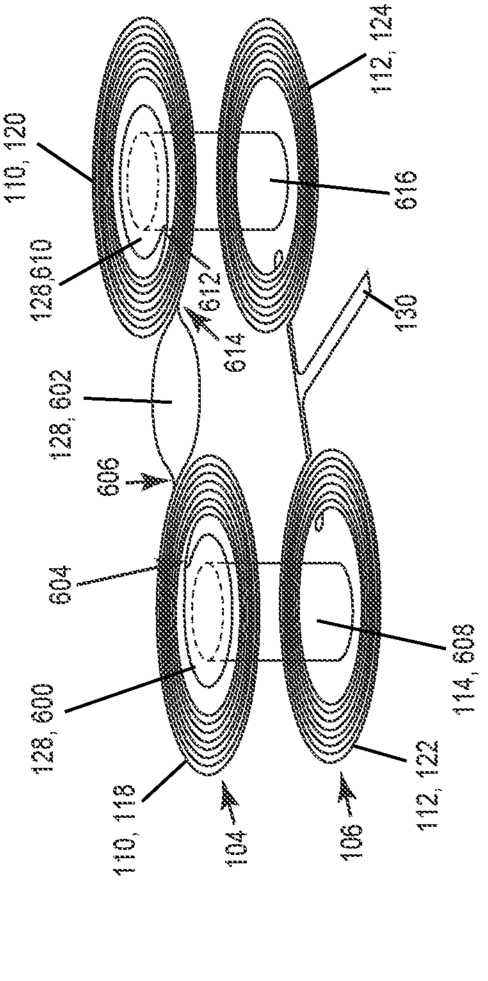
FIG. 7 illustrates a side perspective view of the inductive coupler, according to an embodiment.

FIG. 7 illustrates a side perspective view of the inductive coupler 100, according to another embodiment. According to this embodiment, a first pad 600 and a second pad 602 are formed in the upper metallization layer 104 of the multi-layer stack 102 and interlayer dielectric 516 of the multi-layer stack 102 is not shown to provide an unobstructed view of the entire inductive coupler 100.

The upper winding 110 of the transformer 108 includes a first coil 118 that encircles the first pad 600 and is connected to the first pad 600 at a first end 604 of the first coil 118. The first coil 118 is connected to the second pad 602 at a second end 606 of the first coil 118.

The lower winding 112 of the transformer 108 similarly includes a second coil 122 formed in the lower metallization layer 106 and vertically aligned with the first coil 118. The magnetic material 114 of the inductive coupler 100 adjoins the first pad 600 and vertically extends in a direction towards the second coil 122. In one embodiment, the magnetic material 114 is formed as a first column 608 that adjoins the first pad 600 and vertically extends in a direction towards the second coil 122.

For the dual-coil design illustrated in FIGS. 1 through 3B, a third pad 610 may be formed in the upper metallization layer 104 and the upper transformer winding 104 may include a third coil 120 encircling the third pad 610 and connected to the third pad 610 at a first end 612 of the third coil 120. The third coil 120 is connected to the second pad 602 at a second end 614 of the third coil 120. The lower transformer winding 112 include a fourth coil 124 formed in the lower metallization layer 106 and vertically aligned with the third coil 120. The magnetic material 114 of the inductive coupler 100 adjoins the third pad 610 and vertically extends in a direction towards the fourth coil 124. In one embodiment, the magnetic material 114 is formed as a second column 616 that adjoins the third pad 610 and vertically extends in a direction towards the fourth coil 124.

Figure 8:
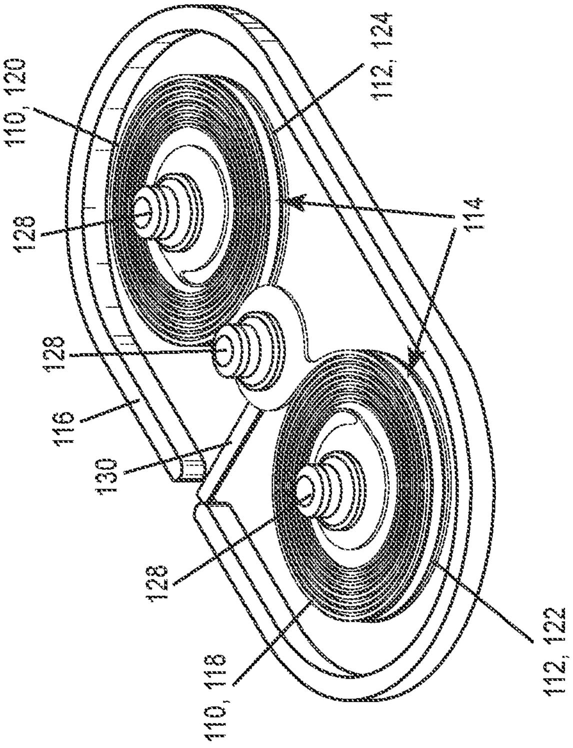
FIG. 8 illustrates a side perspective view of the inductive coupler, according to another embodiment.

FIG. 8 illustrates a side perspective view of the inductive coupler 100, according to another embodiment. According to this embodiment, the magnetic material 114 of the inductive coupler 100 is interposed between the upper winding 110 and the lower winding 112 of the transformer 108. The magnetic material 114 may have a cylindrical shape and the same or smaller diameter as the upper and lower transformer windings 110, 112. The guard ring 116 that laterally surrounds at least part of the transformer 108 may be formed of the magnetic material 114 or of a non-magnetic material such as copper.

Figure 9:
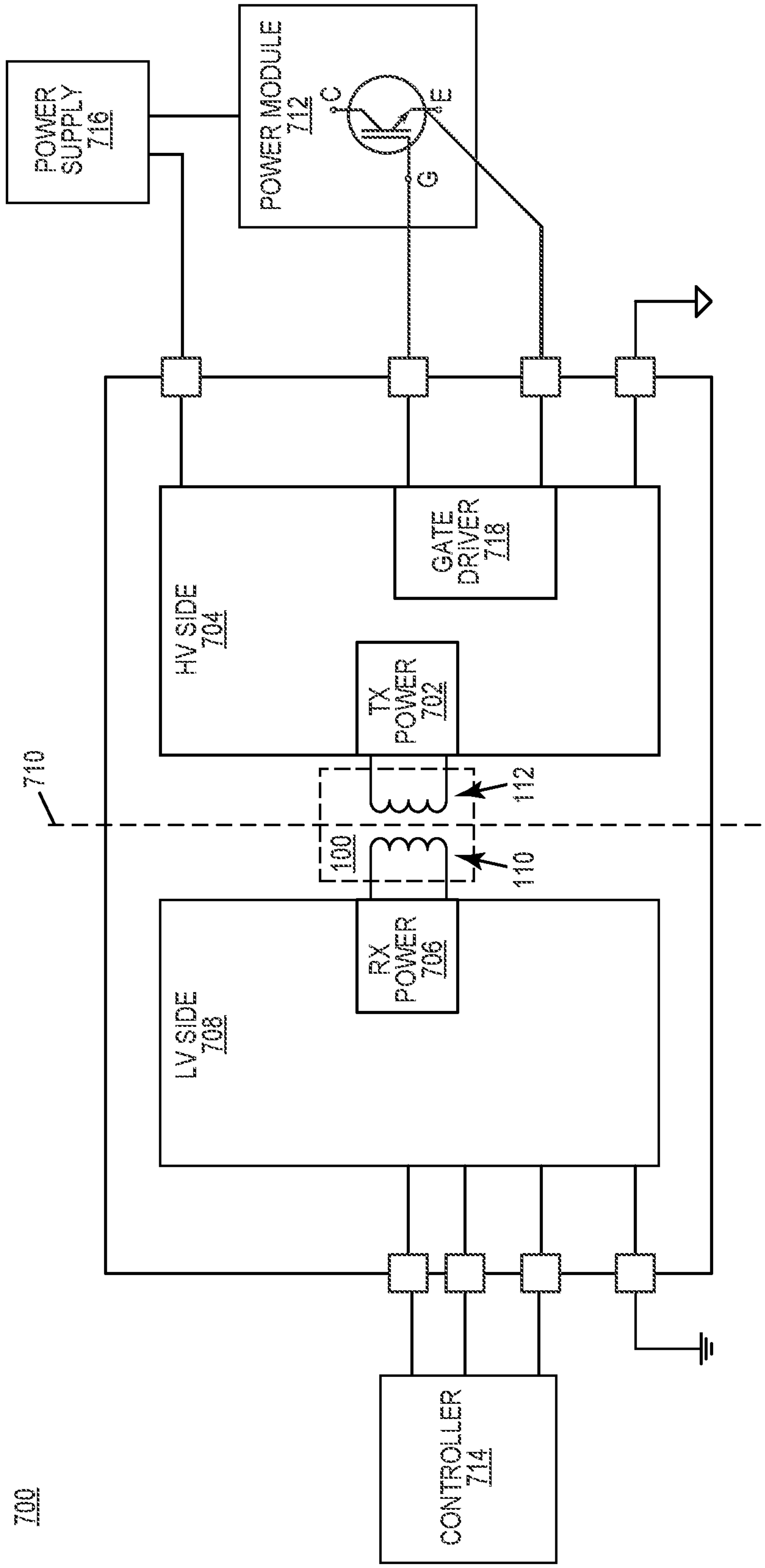
FIG. 9 illustrates a block diagram of an embodiment of an electronic system that includes the inductive coupler.

FIG. 9 illustrates an embodiment of an electronic system 700 that includes the inductive coupler 100 for transferring power from a power transmitter (TX) 702 on a high voltage (HV) side 704 of the electronic system 700 to a power receiver (RX) 706 on a low voltage (LV) side 708 of the electronic system 700, over a galvanic isolation barrier 710. The lower winding 112 of the transformer 108 included in the inductive coupler 100 is electrically coupled to the power transmitter 702. The upper winding 110 of the transformer 108 included in the inductive coupler 100 is electrically coupled to the power receiver 706.

The high voltage side 704 and the low voltage side 708 of the electronic system 700 may each be implemented as a respective semiconductor die or semiconductor module which includes one or more semiconductor dies. The inductive coupler 100 may be integrated in the semiconductor die that includes the power transmitter 702 or in the semiconductor die that includes the power receiver 706. Example embodiments of integrating the inductive coupler 100 in a semiconductor die that includes power transmit or receive circuitry are illustrated in FIGS. 5A through 5C.

The electronic system 700 also may include one or more power transistor modules 712 on the high voltage side 704, a controller 714 on the low voltage side 708, and a power supply 716 on the high voltage side 704. The power transistor module 712 illustrated in FIG. 9 is shown as including one or more IGBTs (insulated gate bipolar transistors) each having a collector 'C', an emitter 'E' and a gate 'G' driven by a gate driver 718 on the high voltage side 704. In general, each power transistor module 712 included in the electronic system 700 may include any type of power transistor devices such as IGBTs, HEMTs (high-electron mobility transistors), power MOSFETs (metal-oxide-semiconductor field-effect transistors), JFETs (junction field-effect transistors), etc. The controller 714 on the low voltage side 708 implements logic-level control of each power transistor module 712, and the gate driver 718 adapts the logic-level control into sufficient gate charge for the power transistor devices. The electronic system 700 may be a power converter, a power inverter, etc.

Although the present disclosure is not so limited, the following numbered examples demonstrate one or more aspects of the disclosure.

Example 1. A semiconductor die, comprising: a semiconductor substrate; a transmitter or receiver circuit in the semiconductor substrate; a multi-layer stack on the semiconductor substrate, the multi-layer stack including a plurality of metallization layers separated from one another by an interlayer dielectric; a transformer in the multi-layer stack and electrically coupled to the transmitter or receiver circuit, the transformer including a first winding formed in a first metallization layer of the plurality of metallization layers and a second winding formed in a second metallization layer of the plurality of metallization layers, the first winding and the second winding being inductively coupled to one another; and a magnetic material in the multi-layer stack and adjacent to at least part of the transformer.

Example 2. The semiconductor die of example 1, wherein the magnetic material is part of a guard ring that laterally surrounds at least part of the transformer.

Example 3. The semiconductor die of example 2, wherein: the first winding comprises a single first coil; the second winding comprises a single second coil; and the magnetic material of the guard ring laterally surrounds the first single coil and the second single coil without interruption.

Example 4. The semiconductor die of example 2, wherein: the first winding comprises a pair of first coils; the second winding comprises a pair of second coils; and the magnetic material of the guard ring laterally surrounds the pair of first coils and the pair of second coils with or without interruption.

Example 5. The semiconductor die of any of examples 2 through 4, wherein the magnetic material of the guard ring follows a curvature of the first and the second windings.

Example 6. The semiconductor die of any of examples 1 through 5, wherein the magnetic material overlaps a lower one of the first and the second windings.

Example 7. The semiconductor die of example 6, wherein the magnetic material is part of a layer of the multi-layer stack disposed below the lower one of the first and the second windings.

Example 8. The semiconductor die of any of examples 1 through 7, wherein the magnetic material overlaps an upper one of the first and the second windings.

Example 9. The semiconductor die of example 8, wherein the magnetic material is part of a layer of the multi-layer stack disposed above the upper one of the first and the second windings.

Example 10. The semiconductor die of any of examples 1 through 9, wherein the magnetic material is part of an intermediary layer of the multi-layer stack interposed between the first and the second windings.

Example 11. The semiconductor die of any of examples 1 through 10, wherein: the magnetic material is part of a layer of the multi-layer stack disposed below a lower one of the first and the second windings, and overlaps the lower one of the first and the second windings; and the magnetic material is part of a layer of the multi-layer stack disposed above an upper one of the first and the second windings, and overlaps the upper one of the first and the second windings.

Example 12. The semiconductor die of example 11, wherein the magnetic material is part of an intermediary layer of the multi-layer stack interposed between the first and the second windings.

Example 13. The semiconductor die of example 11 or 12, wherein the magnetic material is part of a guard ring that laterally surrounds at least part of the transformer.

Example 14. The semiconductor die of any of examples 1 through 13, wherein: a first pad and a second pad are formed in the first metallization layer; the first winding comprises a first coil encircling the first pad and connected to the first pad at a first end of the first coil; the first coil is connected to the second pad at a second end of the first coil; the second winding comprises a second coil formed in the second metallization layer and vertically aligned with the first coil; and the magnetic material adjoins the first pad and vertically extends in a direction towards the second coil.

Example 15. The semiconductor die of example 14, wherein: a third pad is formed in the first metallization layer; the first winding comprises a third coil encircling the third pad and connected to the third pad at a first end of the third coil; the third coil is connected to the second pad at a second end of the third coil; the second winding comprises a fourth coil formed in the second metallization layer and vertically aligned with the third coil; and the magnetic material adjoins the third pad and vertically extends in a direction towards the fourth coil.

Example 16. The semiconductor die of any of examples 1 through 15, wherein the magnetic material is interposed between the first winding and the second winding.

Example 17. An electronic system, comprising: an inductive power coupler formed in a multi-layer stack of a semiconductor die and configured to transfer power from a power transmitter to a power receiver over a galvanic isolation barrier, wherein the inductive power coupler includes a transformer that comprises: a first winding electrically coupled to the power transmitter and formed in a first metallization layer of the multi-layer stack; and a second winding electrically coupled to the power receiver and formed in a second metallization layer of the multi-layer stack, wherein the first winding and the second winding are inductively coupled to one another, wherein a magnetic material in the multi-layer stack is adjacent to at least part of the transformer.

Example 18. The electronic system of example 17, wherein the magnetic material is part of a guard ring that laterally surrounds at least part of the transformer.

Example 19. The electronic system of example 17 or 18, wherein the magnetic material is part of a layer of the multi-layer stack disposed below a lower one of the first and the second windings and overlaps the lower one of the first and the second windings.

Example 20. The electronic system of any of examples 17 through 19, wherein the magnetic material is part of a layer of the multi-layer stack disposed above an upper one of the first and the second windings and overlaps the upper one of the first and the second windings.

Example 21. The electronic system of any of examples 17 through 20, wherein the magnetic material is part of an intermediary layer of the multi-layer stack interposed between the first and the second windings.

Example 22. The electronic system of any of examples 17 through 21, wherein: the magnetic material is part of a layer of the multi-layer stack disposed below a lower one of the first and the second windings, and overlaps the lower one of the first and the second windings; and the magnetic material is part of a layer of the multi-layer stack disposed above an upper one of the first and the second windings, and overlaps the upper one of the first and the second windings.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor die, comprising:

a semiconductor substrate;

a transmitter or receiver circuit in the semiconductor substrate;

a multi-layer stack on the semiconductor substrate, the multi-layer stack including a plurality of metallization layers separated from one another by an interlayer dielectric;

a transformer in the multi-layer stack and electrically coupled to the transmitter or receiver circuit, the transformer including a first winding formed in a first metallization layer of the plurality of metallization layers and a second winding formed in a second metallization layer of the plurality of metallization layers, the first winding and the second winding being inductively coupled to one another;

a magnetic material in the multi-layer stack and adjacent to at least part of the transformer; and a first guard ring designed to isolate electrical disturbances and as a diffusion barrier for preventing contaminants from propagating inward from an edge of the semiconductor die, wherein the first guard ring is formed from part of the metallization layers of the multi-layer stack and metal vias that extend between the metallization layers, wherein the magnetic material includes the second guard ring that laterally surrounds at least part of the transformer, wherein the second guard ring formed by the magnetic material merges or connects to the first guard ring.

2. The semiconductor die of claim 1, wherein the magnetic material further includes an intermediary magnetic layer interposed between the first winding and the second winding.

3. The semiconductor die of claim 1, wherein:

the first winding comprises a single first coil;

the second winding comprises a single second coil; and the second guard ring formed by the magnetic material laterally surrounds the first single coil and the second single coil without interruption.

4. The semiconductor die of claim 1, wherein:
the first winding comprises a pair of first coils;
the second winding comprises a pair of second coils; and
the second guard ring formed by the magnetic material laterally surrounds the pair of first coils and the pair of second coils with or without interruption.

5. The semiconductor die of claim 1, wherein the second guard ring formed by the magnetic material follows a curvature of the first and the second windings.

6. The semiconductor die of claim 1, wherein the magnetic material overlaps a lower one of the first and the second windings.

7. The semiconductor die of claim 6, wherein the magnetic material is part of a layer of the multi-layer stack disposed below the lower one of the first and the second windings.

8. The semiconductor die of claim 1, wherein the magnetic material overlaps an upper one of the first and the second windings.

9. The semiconductor die of claim 8, wherein the magnetic material is part of a layer of the multi-layer stack disposed above the upper one of the first and the second windings.

10. The semiconductor die of claim 1, wherein the magnetic material is part of an intermediary layer of the multi-layer stack interposed between the first and the second windings.

11. The semiconductor die of claim 1, wherein:
the magnetic material is part of a layer of the multi-layer stack disposed below a lower one of the first and the second windings, and overlaps the lower one of the first and the second windings; and
the magnetic material is part of a layer of the multi-layer stack disposed above an upper one of the first and the second windings, and overlaps the upper one of the first and the second windings.

12. The semiconductor die of claim 11, wherein the magnetic material is part of an intermediary layer of the multi-layer stack interposed between the first and the second windings.

13. The semiconductor die of claim 11, wherein the magnetic material further includes an intermediary magnetic layer interposed between the first winding and the second winding.

14. The semiconductor die of claim 1, wherein:
a first pad and a second pad are formed in the first metallization layer;
the first winding comprises a first coil encircling the first pad and connected to the first pad at a first end of the first coil;
the first coil is connected to the second pad at a second end of the first coil;
the second winding comprises a second coil formed in the second metallization layer and vertically aligned with the first coil; and
the magnetic material adjoins the first pad and vertically extends in a direction towards the second coil.

15. The semiconductor die of claim 14, wherein:
a third pad is formed in the first metallization layer;
the first winding comprises a third coil encircling the third pad and connected to the third pad at a first end of the third coil;
the third coil is connected to the second pad at a second end of the third coil;
the second winding comprises a fourth coil formed in the second metallization layer and vertically aligned with the third coil; and
the magnetic material adjoins the third pad and vertically extends in a direction towards the fourth coil.

16. The semiconductor die of claim 1, wherein the magnetic material is interposed between the first winding and the second winding.

17. An electronic system, comprising:
an inductive power coupler formed in a multi-layer stack of a semiconductor die and configured to transfer power from a power transmitter to a power receiver over a galvanic isolation barrier; and
a first guard ring designed to isolate electrical disturbances and as a diffusion barrier for preventing contaminants from propagating inward from an edge of the semiconductor die,
wherein the inductive power coupler includes a transformer that comprises:
a first winding electrically coupled to the power transmitter and formed in a first metallization layer of the multi-layer stack; and
a second winding electrically coupled to the power receiver and formed in a second metallization layer of the multi-layer stack,
wherein the first winding and the second winding are inductively coupled to one another,
wherein a magnetic material in the multi-layer stack is adjacent to at least part of the transformer,
wherein the first guard ring is formed from part of the metallization layers of the multi-layer stack and metal vias that extend between the metallization layers,
wherein the magnetic material includes a second guard ring that laterally surrounds at least part of the transformer,
wherein the second guard ring formed by the magnetic material merges or connects to the first guard ring.

18. The electronic system of claim 17, wherein the magnetic material further includes an intermediary magnetic layer interposed between the first winding and the second winding.

19. The electronic system of claim 17, wherein the magnetic material is part of a layer of the multi-layer stack disposed below a lower one of the first and the second windings and overlaps the lower one of the first and the second windings.

20. The electronic system of claim 17, wherein the magnetic material is part of a layer of the multi-layer stack disposed above an upper one of the first and the second windings and overlaps the upper one of the first and the second windings.

21. The electronic system of claim 17, wherein the magnetic material is part of an intermediary layer of the multi-layer stack interposed between the first and the second windings.

22. The electronic system of claim 17, wherein:
the magnetic material is part of a layer of the multi-layer stack disposed below a lower one of the first and the second windings, and overlaps the lower one of the first and the second windings; and
the magnetic material is part of a layer of the multi-layer stack disposed above an upper one of the first and the second windings, and overlaps the upper one of the first and the second windings.

* * * * *